(12) United States Patent
Wirola et al.

(10) Patent No.: US 8,761,133 B2
(45) Date of Patent: Jun. 24, 2014

(54) USE OF MOVEMENT INFORMATION ABOUT A WIRELESS CLIENT

(75) Inventors: Lauri Aarne Johannes Wirola, Tampere (FI); Mikko Juhani Blomqvist, Tampere (FI)

(73) Assignee: Nokia Corporation, Espoo (FI)

( * ) Notice: Subject to any disclaimer, the term of this patent is extended or adjusted under 35 U.S.C. 154(b) by 1475 days.

(21) Appl. No.: 12/008,998

(22) Filed: Jan. 14, 2008

(65) Prior Publication Data
US 2009/0181695 A1  Jul. 16, 2009

(51) Int. Cl.
*H04W 4/00* (2009.01)
*H04W 24/00* (2009.01)

(52) U.S. Cl.
USPC ........................................ 370/338; 455/456.1

(58) Field of Classification Search
None
See application file for complete search history.

(56) References Cited

U.S. PATENT DOCUMENTS

| 2004/0162084 | A1  | 8/2004  | Wang ........................ 455/456.1 |
| 2004/0233840 | A1* | 11/2004 | Bye .................................. 370/210 |
| 2007/0140220 | A1* | 6/2007  | Doradla et al. ............... 370/352 |
| 2007/0182629 | A1* | 8/2007  | Angus ...................... 342/357.09 |
| 2007/0230420 | A1* | 10/2007 | Bumiller et al. .............. 370/338 |
| 2008/0180316 | A1* | 7/2008  | Pande et al. ................. 342/357.1 |
| 2009/0027222 | A1* | 1/2009  | Larsson et al. ............. 340/686.6 |
| 2009/0069014 | A1* | 3/2009  | Rune ............................. 455/436 |

FOREIGN PATENT DOCUMENTS

| EP | 1274264 | 1/2003 |
| EP | 1351530 | 10/2003 |
| EP | 1804398 | 7/2007 |
| JP | 2006229479 | 8/2006 |
| WO | WO 2005/008969 | 1/2005 |
| WO | WO 2006/062445 | 6/2006 |
| WO | PCT/EP2007/060901 | 10/2007 |

* cited by examiner

*Primary Examiner* — John Blanton
(74) *Attorney, Agent, or Firm* — Locke Lord LLP (57) ABSTRACT

Movement information about a wireless client is correlated with information about the availability of wireless access points. A result of the correlation is used to estimate whether the wireless client is going to enter a region that is associated with a predetermined characteristic.

32 Claims, 7 Drawing Sheets

USE OF MOVEMENT INFORMATION ABOUT A WIRELESS CLIENT

FIELD OF THE INVENTION

The invention relates to the use of movement information about a wireless client.

BACKGROUND OF THE INVENTION

There exist positioning procedures which are based on different kinds of technology. On the one hand, there are global navigation satellite systems (GNSS) for positioning. These are generally characterized by having beacons, mostly satellites, which transmit signals to receiving devices which may then calculate their position from these signals by use of the appropriate algorithms. Examples of GNSS include the Global Positioning System (GPS) as well as Galileo. On the other hand, there are terrestrial positioning systems using beacons which are in general stationary and on the surface of the earth. An example for such a positioning capability would be the use of base stations of a cellular mobile communication system for positioning, for instance the use of base stations of a global system for mobile communications (GSM) infrastructure for GSM localization. GSM base stations are used by the appropriate mobile phones for wireless communication. Increasing miniaturization also makes GNSS technology available to this kind of compact devices with a limited energy supply, thus combining the ability to receive both GNSS and terrestrial signals.

Consequently, an increasing number of such devices are configured to use both kinds of signals for positioning.

In this situation, a device may, on the one hand, make a first position determination based on one kind of signal, for example a GNSS based positioning, and also make a second position determination based on a second kind of signal, for example a GSM localization based positioning. The result of each positioning may then be combined in a suitable way, for example by calculating a weighted mean of the two determined positions or by choosing one of the determined positions by a plausibility check.

As an alternative, one positioning capability can be augmented by the use of another communication system that the device is also configured to use. As in the previous example, a device may be configured for GNSS positioning and also GSM communication. The device may then use the GSM communication for transferring information that increases the effectiveness of the GNSS positioning without necessarily making a positioning based on GSM localization. For example, an estimate of the current position may be transmitted to the device from a GSM base station, thus reducing the time for determining a position using GNSS. One specific way of using the capabilities from one system to complement positioning information from another system would be the assisted global navigation satellite system (A-GNSS) in which data from an assistance server may be transmitted to a mobile device, for example by a GSM connection, to improve positioning using GNSS. For the case that the GNSS is GPS, this technique is known as assisted global positioning system (A-GPS).

Mobile devices are not only increasingly endowed with GNSS positioning capability, but also with wireless communication capabilities either for personal area networks, like for example Bluetooth® and ZigBee, or for wireless local area networks, like Wi-Fi and the particular wireless local area network known as WLAN. In particular for the latter kind of network, there are more and more locations, particularly in urban and suburban areas, where an access point (AP) or a plurality of APs are provided by local municipalities, corporations, restaurants or public institutions for general use. These APs are stationary and their locations are sometimes known, so that based on this information positioning as well as navigation is also possible given that the positions are known. The positioning may for example be performed based on a weighted average of the known wireless AP positions based on relative signal strength values. Thus a mobile device may employ a positioning service in different modes, where each positioning mode corresponds to a different kind of signal received based on which a position is calculated.

SUMMARY

A method is described which comprises correlating movement information about a wireless client with information about an availability of wireless APs. Based on a result of this correlating, it is estimated whether the wireless client is going to enter a region associated with a predetermined characteristic.

Further, an apparatus is described which comprises a correlating component that is configured to correlate movement information about a wireless client with information about an availability of wireless APs. The apparatus further comprises an estimating component configured to estimate based on a result of the correlating whether the wireless client is going to enter a region associated with a predetermined characteristic.

The correlating component and the estimating component of the apparatus can be implemented in hardware and/or software. The apparatus may comprise for instance a processor executing software program code for realizing the correlating component and the estimating component. Alternatively, the apparatus could for instance comprise a circuit that is designed to realize the correlating component and the estimating component, for instance implemented in a chipset or a chip, like an integrated circuit. The correlating component and the estimating component may be comprised in a single component. Further, the described apparatus may comprise exclusively the correlating component and the estimating component, but it may also comprise additional components. The apparatus could further be for example a module provided for integration into a device, like a wireless communication terminal or an accessory device for a wireless communication terminal.

Also described is a device which comprises a correlating component configured to correlate movement information about a wireless client with information about an availability of wireless APs. The device further comprises an estimating component configured to estimate based on a result of the correlating whether the wireless client is going to enter a region associated with a predetermined characteristic.

In addition a system is described which comprises a plurality of wireless APs and an apparatus as described.

Further, a computer readable medium is described in which a computer program code is stored. When executed by a processor, the program code realizes the described method. The computer readable medium could for example be a separate memory device or a memory that is to be integrated in an electronic device. The invention is also to be understood to cover such a computer program code also independently from a computer readable medium.

Moreover, an apparatus is described that comprises means for correlating movement information about a wireless client with information about an availability of wireless APs. The apparatus further comprises means for estimating based on a result of the correlating whether the wireless client is going to enter a region associated with a predetermined characteristic.

The wireless client may be any device or module with wireless communication capability. It may be a mobile phone, a personal digital assistant (PDA), a mobile audio player, a mobile video player, a navigation device with wireless communication capability or an infotainment or navigation unit for a vehicle with wireless communication capability.

Wireless APs are devices that can be accessed by a wireless client for making use of some service. For example, a wireless client may access a wireless AP for establishing a connection to the internet.

The information about an availability of wireless APs may comprise for example position information about wireless APs in general, an information about the density of wireless APs, an information about the signal strength received from the wireless APS, an information about the precision with which positioning based on wireless APs is possible, or an identifier for each wireless AP as well as information about the position of each wireless AP.

The movement information may comprise a projected route for the wireless client in the future and/or a projected position for the wireless client at a point in time in the future. For example, the movement information may comprise a projected route for the wireless client for a certain length of time into the future.

Correlating the movement information with the position information may comprise for example determining for projected positions of the wireless client at future times a distance to the closest wireless AP at that time or the density of wireless APs at that point.

The region may be any terrestrial area. It need not be a contiguous area and may be of any size and any shape. It need not be bounded by any visible boundary.

Estimating whether the wireless client is going to enter a region may mean determining a probability that the wireless client is going to enter the region. It may mean determining that the wireless client has already entered the region. It may also mean determining whether it is more likely that the wireless client is going to enter the region or that the wireless client is not going to enter the region.

An increasing number of wireless clients have a wireless communication capability that is cellular based, for example communication via GSM, and/or a wireless communication capability that is based on wireless local area networks.

Because the positions of the wireless APs are known and fixed, it may be determined when a wireless client is entering or leaving regions defined by the presence or absence of these wireless APs.

The invention thus provides the capability to determine if a specific region has been entered using means with which the wireless client comes equipped.

This information may be used for different purposes, for example for saving power by reducing the power consumption of resources that are not needed or are not available within the region.

In one embodiment of the invention, estimating whether the wireless client is going to enter a region associated with a predetermined characteristic may comprise estimating a point in time when the wireless client is going to enter the region. This estimation may also comprise determining a probability for each point in time in the future that the wireless client will have entered the region at that point in time. The estimated point in time may then be that point in time at which it is more likely that the wireless client will have entered the region than that the wireless client will have not moved to the region.

In a further exemplary embodiment, the movement information about the wireless client may be determined based on a position and a velocity of the wireless client. The position may comprise positions of the wireless client in the past and a current position. Similarly, the velocity may comprise velocities in the past and a current velocity. The velocity may be determined from a history of position information or it may be determined for example from information provided by an inertial sensor or from velocity information of a vehicle that the wireless client is associated with. The projected routes and positions may be estimated for example by using dead reckoning or any other projection method.

The movement information may also be determined based on evaluating a determined guidance route. The guidance route may be a route determined and suggested by a guidance system for getting to a specific location from the current position. The guidance system may be a personal portable guidance system, or it may for example be the guidance system of a car, bus or other vehicle. The guidance system may also be comprised by the wireless client itself. The movement information may be determined by assuming that the wireless client is going to follow the route provided by the guidance system. The movement information may also comprise velocity information that is either assumed by the guidance system, for example based on the kind of road that is to be used according to the suggested route of the guidance system, or that is based on a history of the velocity of the wireless client.

In another exemplary embodiment of the invention, the estimation whether the wireless client is going to enter a region associated with a predetermined characteristic may be used as a decision criterion for switching a service to at least one of at least two modes. Some or all of the modes of the service may not be mutually exclusive. Thus the service may be switched to two or more modes simultaneously. The estimation whether the wireless client is going to enter the region may be a necessary condition or may be a sufficient condition for switching the service to at least one of at least two modes. The estimation may also be neither necessary nor sufficient and instead weighed with other decision criteria to determine whether or not to switch the service to at least one of at least two modes.

In yet another embodiment of the invention, the estimated point in time when the wireless client is going to enter a region associated with a predetermined characteristic may be used as decision criterion for switching a service to at least one of at least two modes. The service may be switched to the at least one mode at the time that it is estimated that the wireless client is going to enter the region. The service may also be switched to at least one of at least two modes a certain time before or after that it is estimated that the wireless client is going to enter the region. The estimated time at which the wireless client is going to enter the region may also be weighed with other factors to decide when to switch a service to at least one of at least two modes. The service may be simultaneously switched to different modes if the modes are not mutually exclusive.

The predetermined characteristic with which the region is associated may comprise at least one of a level of wireless AP density and a level of GNSS coverage. The level of wireless AP density may for example be a numerical value, such as the number of wireless APs that are within a maximum distance of each point in the region. It may also be a qualitative value denoting a high, medium or low density of wireless APs.

Further, it may be a value indicating a signal reception level from a wireless AP or from a plurality of wireless APs. Similarly, the level of GNSS coverage may indicate by a numerical value the quality of a received GNSS signal.

The predetermined characteristic may also be a binary value indicating whether GNSS coverage is present or not. The predetermined characteristic with which the region is associated may also be an indicator whether or not positioning using a GNSS or some other service is possible in the region or not.

The region may thus for example be a region which is defined by all points which have a maximum distance to a minimal number of wireless APs. It may also be defined by all points for which there is a minimal signal reception level from a wireless AP.

A single point or position may also belong to one or more different regions at the same time. For example, a given position may be comprised in a region characterized by a medium density of wireless AP density. The same position may also be comprised in a region characterized by having no GNSS coverage. The characteristic of a region may comprise a combination of different defining features. For example, a region may be characterized by having at least a certain level of wireless AP density and at the same time no GNSS coverage. By the same token, the same region may have a plurality of characterizations.

In a further embodiment, the predetermined characteristic may be associated with a region via a map. Associating a predetermined characteristic with a region via a map may comprise looking up the region at the position on the map. The characteristic associated with this region may also be looked up at the position on the map. Thus each position on the map may define a region to which this position on the map belongs and a characteristic associated with this region. It may also be that the positions of the wireless APs are indicated on the map, so that for each position on the map the region and the characteristic with which the region is associated is determined from the positions of the wireless APs on the map.

The service may thus be a positioning service comprising a plurality of modes of positioning. For the case of a positioning service, the modes of the service may comprise a fully operational mode of the at least one kind of positioning and a mode with reduced power consumption for this kind of positioning. The service may be simultaneously switched to different modes of positioning.

The plurality of modes of positioning may comprise for example at least one of the following: An active mode of a GNSS-based positioning. In this mode the GNSS-based positioning is fully operational. An example of a GNSS-based positioning would also be A-GNSS. The plurality of modes of positioning may also comprise a reduced power consumption mode of a GNSS-based positioning. In this mode the GNSS-based positioning is not fully functional. The time it takes to switch to an active mode of a GNSS based positioning may vary. The plurality of modes of positioning may further comprise a switched off mode of a GNSS-based positioning. In this mode the GNSS-based positioning is not consuming energy. The plurality of modes of positioning may also comprise an active mode of terrestrial positioning. The terrestrial positioning may for example comprise GSM localization but also a wireless local area network based positioning service. The plurality of modes of positioning may also comprise a reduced power consumption mode and a switched off mode of terrestrial positioning. The plurality of modes of positioning may yet further comprise hybrid modes of positioning combining both terrestrial and GNSS-based modes of positioning. For example, the plurality of modes of positioning may comprise a mode combining a reduced power consumption mode of a GNSS-based positioning and an active mode of terrestrial positioning. Another mode comprised in the plurality of modes of positioning may be a mode combining a fully operational mode of a GNSS-based positioning and a switched off mode of terrestrial positioning.

All these positioning systems depend on the reception of signals, and the positioning quality improves with the number of transmitters from which these signals are received. However, the availability and reception of these signals varies significantly from one location to the next.

Signals from GNSS systems tend to be more difficult to receive for a mobile device when it is in an urban environment, because by being near tall buildings or especially by being in a building the signal reception is significantly degraded. When there is a clear line of sight to the sky, which is more common in a rural environment, signal reception tends to be better.

For terrestrial or cellular-based localization techniques, but especially for wireless local area network based techniques, the converse is true. Densely populated urban areas and particularly the inside of buildings tend to host a high number of APs for wireless networks, whereas there are fewer in suburban areas and very little APs for wireless networks in rural or wilderness areas.

An important aspect for any mobile device and in particular mobile phones is energy consumption. The operation of a positioning service, in particular when the positioning service is based on GNSS, consumes a lot of power because for each kind of signal a dedicated receiver needs to be powered. Therefore energy may be saved by switching the operation of a positioning service into a mode with reduced power consumption, in particular when the particular mode of positioning, for example one based on GNSS, cannot be used or does not need to be used.

Thus if in certain predetermined regions it is known that good signal reception for a particular positioning system is available, whereas in other predetermined regions it is known that signal reception for a particular positioning system is poor or not existent, then this information may be used to switch the positioning service of a mobile device as it moves through such regions into such modes that power is not unnecessarily wasted on positioning systems that do not function in that particular locale.

Such an embodiment of the invention has very low implications for a conventional positioning and navigation process. This positioning and navigation process may function as normal unless it is not functional or needed anyway.

It is to be understood that determining the movement of a mobile device through regions with a predetermined level of coverage may also be relevant to other types of services than positioning, and for other purposes than reducing the power consumption.

For example, if it is determined that a region is entered with no WLAN APS within range, then a WLAN receiver may be switched to a deactivated mode as long as it is determined that the wireless clients in a region with no WLAN APs within range.

In an exemplary embodiment, a GNSS-based positioning service is switched to an active mode of GNSS-based positioning in time to ensure that the positioning service is functional in an active mode of the GNSS-based positioning at the estimated time when the wireless client is going to enter the region associated with a predetermined characteristic. In general, once a GNSS-based positioning service is switched to an active mode from a reduced power consumption mode or a switched off mode it takes a certain time before the GNSS-based positioning becomes fully functional. If this length of time is known or estimated, then the GNSS-based positioning service may be switched to an active mode this length of time before the wireless client is estimated to enter the region such that the GNSS-based positioning service is fully functional when the wireless client enters the region.

In addition, in an exemplary embodiment of the invention the length of time that the wireless client will be in the region associated with a predetermined characteristic is estimated. This length of time may, for example, be estimated based on information about the size and extent of the region and further based on velocity information about the wireless client, so that the time in which the wireless client traverses the region is estimated. The estimation may also be based on a determined guidance route through the region and on an assumed velocity of the wireless client on this route determined by the guidance system.

In an exemplary embodiment of the invention, the estimated length of time that the wireless client will be in the region may be used as a decision criterion for switching a service to at least one of at least two modes. If, for example, it is determined that the length of time that the wireless client will be in the region is below a certain threshold, then it may be concluded that the service shall not be switched, because the region is left by the wireless client soon thereafter anyway. This is in particular the case when switching the service from one mode to another takes more time than the estimated time that the wireless client will be in the region.

As yet another exemplary embodiment, the association of a region with a predetermined characteristic may be updated. For example, a characteristic that could be updated may indicate whether a GNSS-based mode of positioning is possible or not. If the region is associated with the characteristic whether or not a GNSS-based mode of positioning is possible, and if the wireless client is in a region where the GNSS-based mode of positioning should be possible according to a characteristic of the region, but it is determined that in fact GNSS-based positioning is not possible in this region, then an association of a region with the characteristic may be updated to indicate that a GNSS-based mode of positioning is not possible in this region. Conversely, if the wireless client is in a region where the GNSS-based mode of positioning should not be possible according to a characteristic of the region, but it is determined that in fact GNSS-based positioning is possible in this region, then an association of a region with the characteristic may be updated to indicate that a GNSS-based mode of positioning is in fact possible in this region.

In a further exemplary embodiment of the invention, the wireless APs may comprise at least one of wireless local area network communication APs, Wi-Fi™ communication APs, WiMax communication APs, cellular communication APs, Bluetooth® communication APs, Wibree™ communication APs, and ZigBee® communication APs, but equally any other type of wireless APs.

In the embodiments that are related to a GNSS, the GNSS may for example be one of GPS, Galileo, the Russian global navigations satellite system (GLONASS). It may also be an A-GNSS such as A-GPS. A list of further examples that is not exhaustive for an A-GNSS includes satellite based augmentation system (SBAS), quasi-zenith satellite system (QZSS), local area augmentation system (LAAS) or any combination of these.

The described device according to the invention may comprise in addition a user interface in an exemplary embodiment.

The invention can be employed for example in very small and lightweight electronics applications. It can be provided for professional use, but also for fun applications, such as a consumer entertainment electronics device like a mobile phone or a mobile game console.

It is to be understood that all presented exemplary embodiments and all features of all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
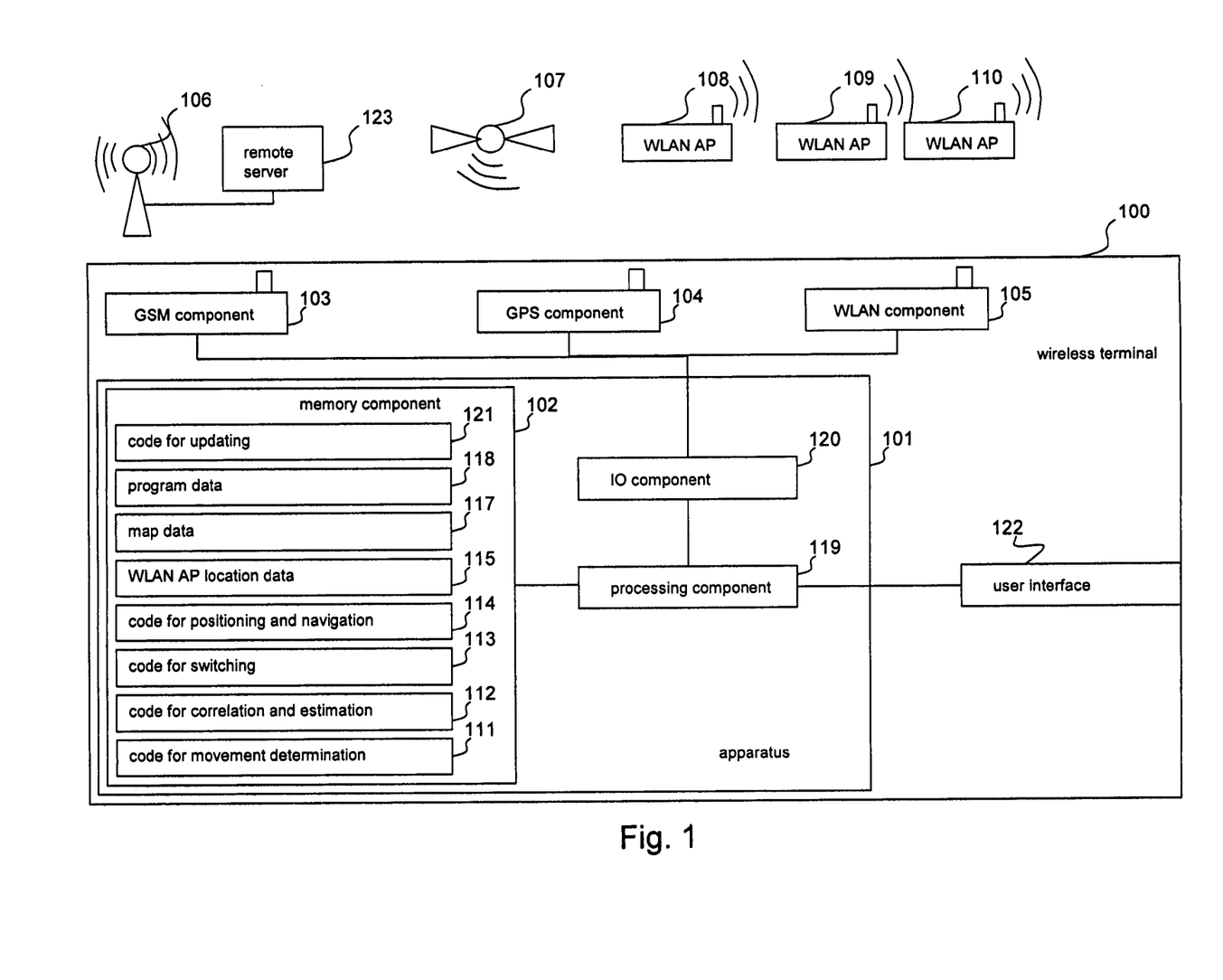
FIG. 1 is a diagram schematically illustrating an exemplary embodiment of a system according to the invention.

FIG. 1 is a diagram schematically illustrating an exemplary system in which a movement of a wireless client between regions of different characteristics can be detected in accordance with the invention.

The system comprises a wireless terminal 100 comprising an apparatus 101, a GSM component 103, a GPS component 104, a WLAN component 105 and a user interface 122. The system further comprises a GSM base station 106, a GPS beacon 107, WLAN APs 108, 109, 110 and a remote server 123. The wireless client of the invention may correspond for example to wireless terminal 100 or to WLAN component 105.

The apparatus 101 of wireless terminal 100 comprises a processing component 119 configured to implement various algorithms. The apparatus 101 comprises in addition an input output (IO) component 120, a memory component 102, which in turn comprises code for movement determination 111, code for correlation and estimation 112, code for switching 113, code for positioning and navigation 114, WLAN AP location data 115, map data 117, program data 118 and code for updating 121.

The processing component 119 is configured to run program code 111-114 and 121 that implement the functionality of an embodiment of the present invention. The processing component 119 may also run program code for a wide variety of other functionalities concurrently, for example in separate threads or processes.

The processing component 119 may for example be a microcontroller unit, a miniature computer, a dedicated integrated circuit implemented on a chip or a signal processor. The code for positioning and navigation 114 may be running on the processing component 119 and thus may implement a positioning service that determines the position of wireless terminal 100. This positioning service may be run in several modes.

The memory component 102 connected to processing component 119 moreover may comprise read only memory (ROM), random access memory (RAM), flash memory and a hard drive.

The code for movement determination 111 is adapted to determine a velocity of the wireless terminal 100. The code for correlation and estimation 112 is adapted to correlate movement information with position information about wireless APs to estimate whether and when the wireless terminal 100 is going to enter a region. The code for switching 113 is adapted to switch the positioning service in one of a plurality of modes. The code for positioning and navigation 114 is adapted to determine or estimate a position of the wireless terminal 100 and for projecting a future position of the wireless terminal 100. It is further adapted to navigate and determine a guidance route for the wireless terminal 100 for reaching a particular destination. The WLAN AP location data 115 stores information about the position of WLAN APs. The map data 117 stores map information, defines regions and associates them with characteristics. For example, it defines regions associated with a characteristic indicating the availability of WLAN. It may also define regions associated with the characteristic that positioning by means of GPS signals is possible and it also defines regions associated with the characteristic that positioning by means of GPS signals is not possible. It also comprises other information associated with the area on the map, for example road information, landmarks and so forth. The program data 118 stores various data generated during operation of the processing component. The code for updating 121 is adapted to update the characteristic of a region indicating whether positioning based on GNSS is possible or not, or, in other words, to update a characteristic of a region indicating whether GNSS coverage exists in this region. The code for updating 121 may further be adapted to update an association of a region with any predetermined characteristic.

In addition, the processing component 119 is connected to the IO component 120 with which the apparatus 101 is configured to communicate with other components.

The apparatus 101 is connected via IO component 120 to a GSM component 103 which is configured for cellular communication using the GSM protocol. According to the present invention, the choice of GSM is just by way of example. Alternatively any cellular communication system may be used including, but not limited to, universal mobile telecommunications system (UMTS), CDMA2000 and wideband code division multiple access (W-CDMA). The GSM component 103 enables apparatus 101 to transmit and receive data using either connection based communication or packet based communication. Position and identity information about wireless APs, including wireless APs that are not based on GSM or any other cellular communication system, may be transmitted to the apparatus 101 via GSM component 103 from remote server 123. In particular, position and identity information about WLAN APs as well as map information may be initially transmitted to the apparatus 101 via GSM component 103 from remote server 123 when the apparatus 101 is activated and may not yet have this information. In addition, updates to the WLAN AP location data 115, to the map data 117 and to the program data 118 may be transmitted to the apparatus 101 via GSM component 103 from remote server 123.

The apparatus 101 is also configured to receive signals from the GSM component 103 used for a terrestrial positioning like cell identification and time difference of arrival (TDOA). Thus the GSM component 103 may provide information for use by the processing component 119 when the positioning service of the apparatus 101 is running in a mode based on GSM localization of the code for positioning and navigation 114.

The apparatus is further connected via IO component 120 to the GPS component 104, which is configured to receive positioning signals from GPS beacon 107. The GPS beacon 107 may be a satellite or a terrestrial beacon functioning as a pseudolite. In the present invention, also the choice of GPS is just by way of example. Alternatively any GNSS may be used including, but not limited to, GPS, Galileo or GLONASS.

Running the code for switching 113 on the processing component 119, the processing component 119 may further switch the GPS component 104 in a mode with reduced power consumption or it may switch the GPS component 104 off completely. The mode with reduced power consumption may, for example, entail reducing the measurement rate of the GPS component 104, or if it is based on a microprocessor, switching it into sleep mode. While running the code for switching 113, the processing component 119 may also switch the GPS component 104 back into fully operational mode. It may be that the length of time it takes for the GPS component 104 to be fully functional is greater if it was switched completely off than if it was switched in a mode with reduced power consumption.

Running the code for positioning and navigation 114, the processing component 119 may also receive positioning information from the GPS component 104. This may be the raw measured data from the GPS component 104 or it may be already processed and determined position information. Thus, the actual processing of the positioning data may occur in the GPS component 104 or in the processing component 119. Consequently, the GPS component 104 may provide positioning information for use by the processing component 119 when the positioning service of the apparatus 101 is running in a mode of positioning based on GNSS.

For this mode, the processing component 119 may run the code for positioning and navigation 114 to determine a position and navigate based on the positioning signals received from the GPS component 104.

When using positioning information from the GPS component 104, the processing component 119 may simultaneously also use information supplied either from at least one of the GSM component 103 or the WLAN component 105 to augment the positioning information from the GPS component 104. For example, the processing component 119 may receive either an estimated position information via the GSM component 103 and a base station 106 from a remote server 122, or it may receive information about a received GPS signal from a more powerful GPS receiver from a remote server 122 via a base station 106 and the GSM component 103. In this way, for example an A-GPS positioning or any other A-GNSS positioning can be performed.

The apparatus 101 is further connected via IO component 120 to WLAN component 105. This WLAN component 105 is based on a WLAN wireless local area network system by way of example. According to the present invention, Bluetooth®, Wi-Fi®, WiMax, Wibree™ or ZigBee® or any other wireless local area network system may be used.

The WLAN component 105 can establish a WLAN connection by wirelessly connecting to WLAN APs. The WLAN APs 108, 109, 110 are within the range of the WLAN component 105. The WLAN APs 108, 109, 110 may be identified by WLAN component 105 by their signals. Their identity as well as their respective locations are stored in the WLAN AP location data 115 of the memory component 102 and are thus accessible to the processing component 119. Consequently, by running code for positioning and navigation 114 on the processing component 119, the apparatus 101 is able to use a WLAN-based terrestrial mode of positioning with the information supplied by the WLAN component 105. This may comprise determining a position by evaluating the signal and the signal strength received from the WLAN APs 108, 109, 110 and based on the WLAN AP location data 115.

Because the WLAN APs 108, 109, 110 may be identified based on their signals, and because the position of each WLAN AP is known from the WLAN AP location data 115, the position of the wireless terminal 100 may be determined by evaluating which of the known WLAN APs are within the range of the WLAN component 105. The signal strength of a received signal from a WLAN AP is indicative of the distance of the WLAN AP to the WLAN component 105 and thus to the wireless terminal 100.

In addition, the user interface 122 comprised in the wireless terminal 100 may in turn comprise at least one of a keypad, a screen, a touchscreen, a microphone and a loudspeaker. The user interface 122 is further connected to the processing component 119 of apparatus 101.

As an example, the wireless terminal 100 may be a mobile device, possibly a mobile phone, a mobile audio player, a PDA, a mobile video player, a mobile game console, a navigation device with wireless communication capability, an infotainment or navigation unit for a vehicle with wireless communication capability or a similar device.

Figure 2:
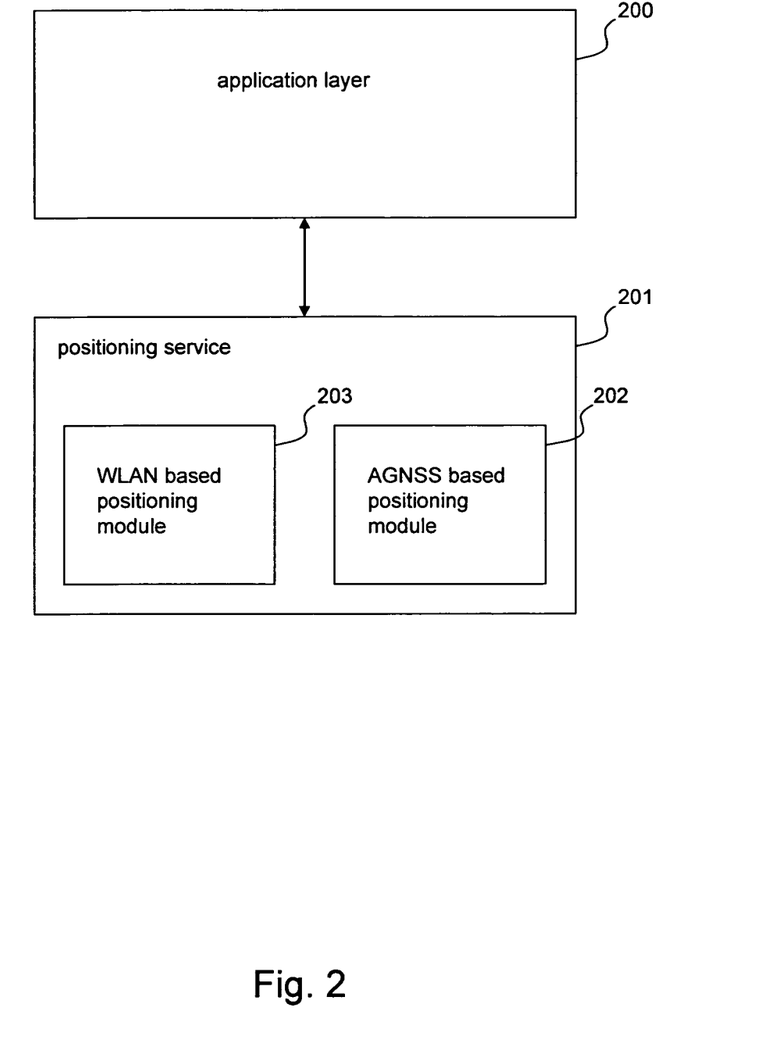
FIG. 2 is a schematic block diagram illustrating the use of different modes of a positioning service by an application layer.

FIG. 2 is a schematic block diagram in which the use of different modes of positioning of a positioning service by an application layer 200 is illustrated. The application layer 200 may comprise a location based service requiring position information about the wireless terminal. This may for example be a navigation or guidance application that determines a route on how to reach a desired destination. Other applications may be running concurrently in the application layer 200, some of which may not be configured to use a positioning service. This application layer 200 has an interface to the abstraction layer of a positioning service 201.

The application layer 200 may formulate a request or command to the positioning service 201 via the interface to the positioning service 201. This request or command is not associated with a particular mode of positioning of the positioning service 201. That is, it makes no difference to the application layer 201 how exactly this positioning information is retrieved or the request or command processed. This information on how the request or command is processed is also not communicated to the application layer 200.

Once the positioning service 201 has received the request or command from the application layer 200, it uses the mode of positioning to which it is switched. If the positioning service 201 is switched to an active mode of WLAN-based positioning, then the request or command is processed by the WLAN-based positioning module 203. If, on the other hand, the positioning service 201 is switched to an active mode of A-GNSS-based positioning, then the request or command is processed by the A-GNSS-based positioning module 202. Neither the information which mode is used for the processing nor the information which mode is the active mode of the positioning service needs to be communicated outside the positioning service 201. Consequently, if and when the positioning service 201 is switched to a different mode of positioning, this may also not be communicated outside the positioning service 201.

It follows that the request or command is then processed transparently by the positioning service 201 and an appropriate response sent to the application layer 200. Thus the information about which mode of positioning the positioning service 201 uses may be hidden from the application layer 200.

The application layer 200 as well as the positioning service 201, the WLAN-based positioning module 203 and the A-GNSS-based positioning module 202 may for example be comprised in the code for positioning and navigation 114 and thus be part of the software running on the processing component 119 of apparatus 101 of FIG. 1.

Figure 3:
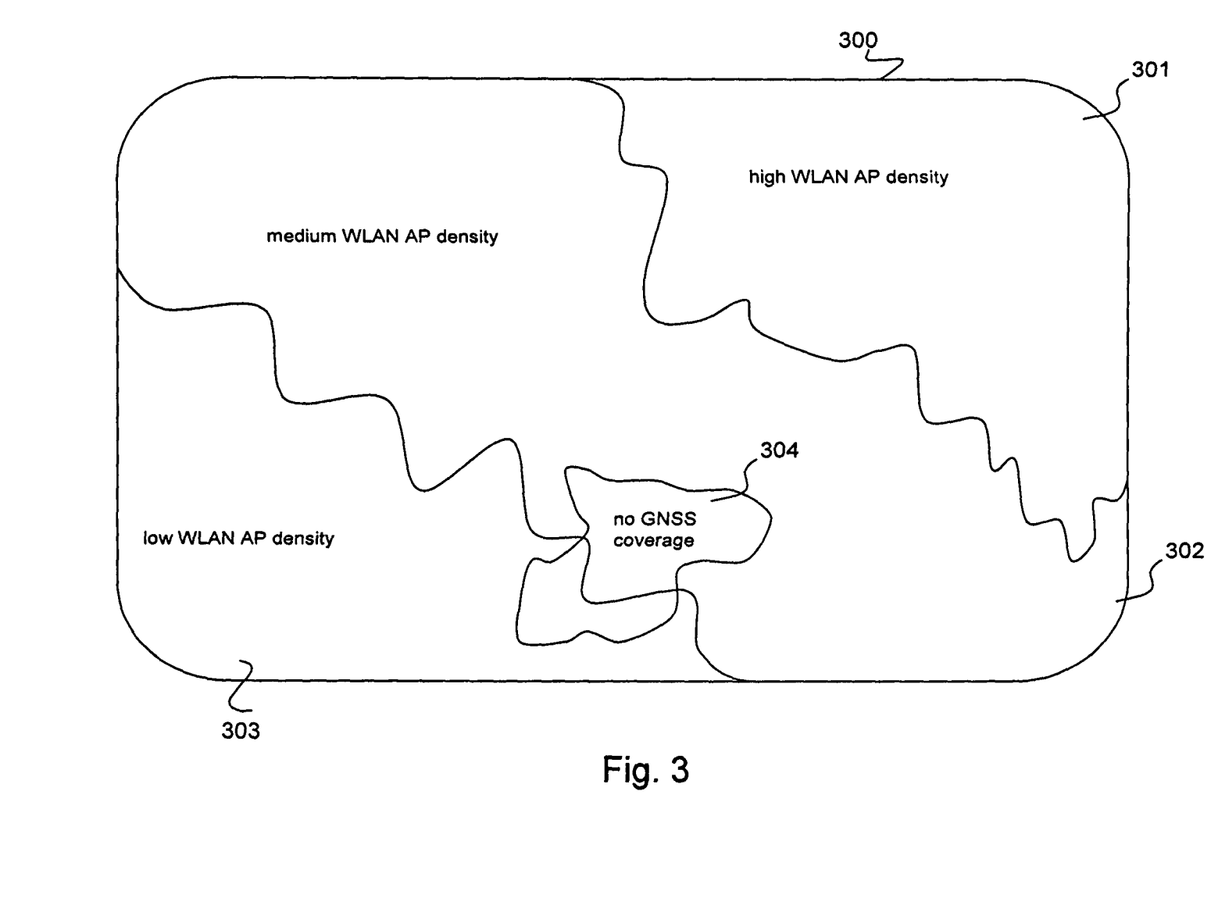
FIG. 3 schematically illustrates the map of an area comprising regions associated with different characteristics.

FIG. 3 schematically illustrates the map data 117 of an area comprising regions associated with different characteristics. In some embodiments the map data 117 may comprise the WLAN AP location data 115 as well, or vice versa. The depicted map 300 may be a detail of a larger map. The map 300 comprises a region 301 characterized by high WLAN AP density 301, a region 302 characterized by medium WLAN AP density, a region 303 characterized by low WLAN AP density and a region 304 characterized by having no GNSS coverage. A part of region 304 overlaps with region 302 and another part of region 304 overlaps with region 303.

If a wireless terminal according to the present invention moves from a starting position in region 301 characterized by high WLAN AP density to a position in region 303 characterized by low WLAN AP density and does not pass through region 304 characterized by having no GNSS coverage, then at a certain position the positioning service of the wireless terminal may switch to an active mode of GNSS-based positioning and also switch to a switched off mode of WLAN-based positioning. If, on the other hand, the wireless terminal moves from a starting position in region 301 characterized by high WLAN AP density to a position in region 303 characterized by low WLAN AP density and passes through region 304 characterized by having no GNSS coverage, then the positioning service may only be switched to an active mode of GNSS-based positioning after the wireless terminal has left region 304.

If the wireless terminal is in a position on the map 300 and it is determined that the wireless terminal is not able to use a positioning service in a GNSS-based mode of positioning, then the map 300 may be updated such that this current position may become a part of region 304 characterized by having no GNSS coverage or it may form a new region also characterized by having no GNSS coverage.

Conversely, if the wireless terminal has entered region 304 and it is determined that at the wireless terminal's position a GNSS-based mode of positioning is functional, then the map 300 may be updated such that this current position is no longer a part of region 304 characterized by having no GNSS coverage.

Figure 4:
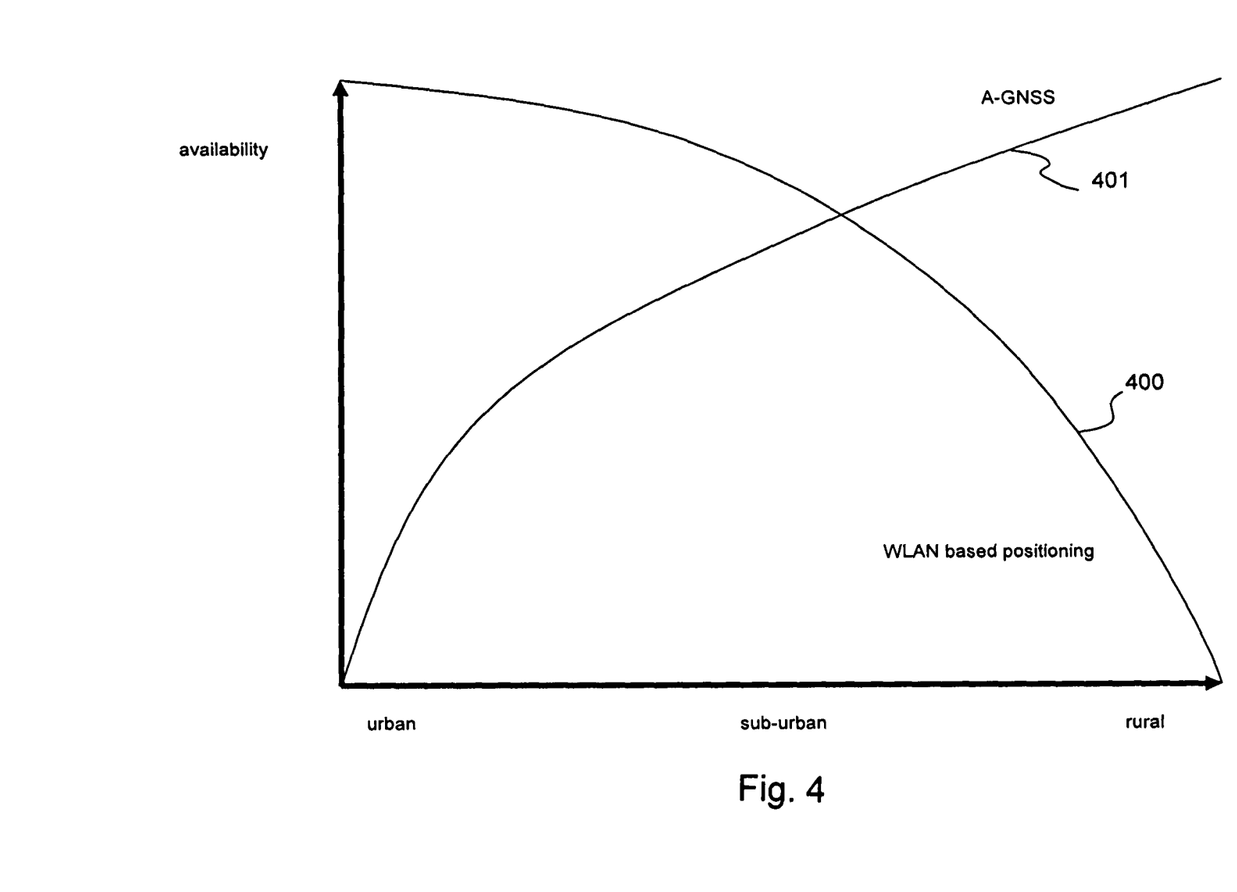
FIG. 4 is a graph illustrating the availability of different modes of a positioning service against a movement from one kind of environment to another.

FIG. 4 is a graph illustrating the availability of different modes of a positioning service against a movement from one kind of environment to another.

Plot 400 indicates the availability of WLAN based positioning. Plot 401 indicates the availability of A-GNSS-based positioning. The availability of WLAN-based positioning is high in an urban environment and decreases when moving to a suburban environment. It decreases even further when moving from a suburban environment to a rural environment and eventually vanishes. This behaviour is due to the WLAN AP density, which is typically very high (several thousands per square km) in urban areas.

The availability of A-GNSS-based positioning is very low in a dense urban environment due to signal blockage by tall buildings. It increases when moving to a suburban environment. It increases even further when moving to a rural environment from the suburban environment.

Thus the availability of A-GNSS-based positioning and WLAN based positioning is complementary. Depending on the specific level, a positioning service may be switched to an active mode of an A-GNSS-based positioning and a switched off mode of a WLAN-based positioning when the availability of a WLAN-based positioning has decreased below a first threshold value. Similarly, a positioning service may be switched to an active mode of WLAN-based positioning and a reduced power consumption mode of an A-GNSS-based positioning when the availability of a WLAN-based positioning has increased above a second threshold value. The first and second threshold value may be identical but need not be. In particular, if the first threshold value is below the second threshold value a hysteresis is achieved.

Figure 5:
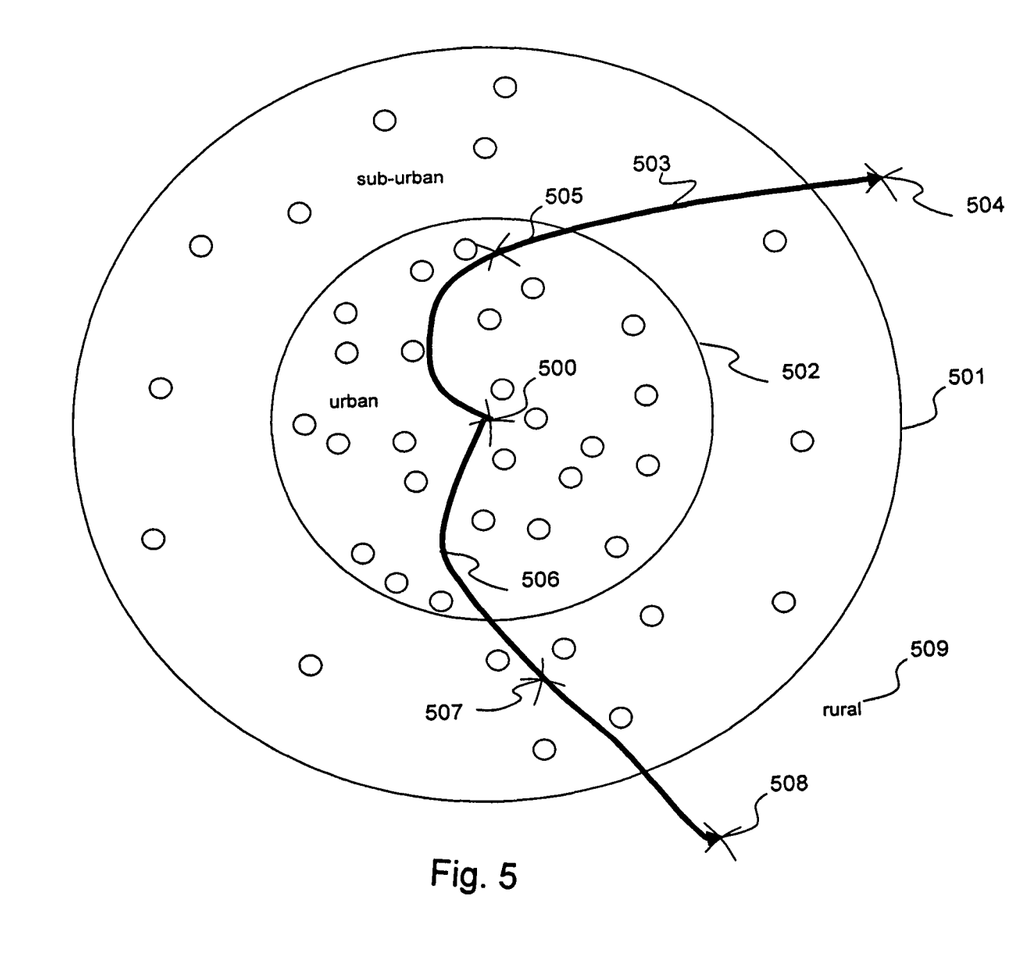
FIG. 5 is a diagram schematically illustrating courses of movement of an exemplary embodiment of a device according to the invention through regions with different levels of wireless AP density.

FIG. 5 schematically illustrates courses of movement of such a wireless terminal 100 of FIG. 1 through regions with different levels of wireless AP density.

A starting position 500 of a wireless terminal 100 within an urban area 502 consisting of regions with a generally high density of wireless access points is depicted. Surrounding the urban area 502 is a suburban area 501 consisting of regions with a generally low density of wireless access points. Outside the suburban area 501 there is a rural area 509 consisting of regions with a very low density of wireless access points and thus generally no reception of signals from wireless access points. A first course 505 is shown along which the wireless terminal 100 moves from the starting position 500 in the urban area 502 to the finishing position 504 in the rural area 509. A second course 506 is shown along which the wireless terminal 100 moves from the starting position 500 in the urban area 502 to the finishing position 508 in the rural area 509.

At the starting position 500, the wireless terminal 100 is in a region with a high density of wireless access points. Because the wireless terminal 100 has information about the identity and location of the wireless access points in the urban area 502 and the suburban area 501, the wireless terminal 100 is able to run a positioning service in an active mode of WLAN-based positioning. The high density of wireless access points does not require any other additional positioning information. In order to reduce energy consumption, the positioning service of the wireless terminal 100 is also switched to a reduced power consumption mode of GPS-based positioning.

As the wireless terminal 100 moves along the course 503, the positioning service in the active WLAN-based mode determines a current position of the wireless terminal 100. It also determines a current velocity of the wireless terminal 100, for example by evaluating the change in position of the wireless terminal 100 over time. By correlating this information with the information about the positions and identities of the wireless access points, the wireless terminal 100 estimates a time at which the wireless terminal 100 will enter a region in which the density of wireless access points is too low for a functioning of the positioning service while it is switched to an active mode of WLAN based positioning and a reduced power mode of GPS-based positioning. Based on the information about the time that it takes the active mode of GPS-based positioning to be functional after being switched from a reduced power consumption mode of GPS-based positioning, the wireless terminal 100 may determine an earlier time before the estimated time, such that an active mode of GPS-based positioning is functional at the estimated time if it is switched to an active mode at that determined earlier time. This may essentially be the time that it takes a GPS receiver to become fully operational after it has been in a mode with reduced power consumption.

While moving along course 503, the wireless terminal 100 switches the GPS-based positioning to an active mode as it passes location 505 on course 503. When the GPS-based positioning is fully operational, the positioning service of the wireless terminal may switch to an active mode of GPS-based positioning. It may simultaneously also switch to a switched off mode of WLAN-based positioning, because WLAN-based positioning may no longer be needed if GPS-based positioning is available.

Analogous to the procedure just described, as the wireless terminal 100 moves along the course 506, the positioning service of the wireless terminal 100 also starts in the active mode of WLAN based positioning. The wireless terminal 100 then switches the GPS based positioning to an active mode as it passes location 507 on course 506 and performs the same steps as described above at the corresponding times.

Figure 6:
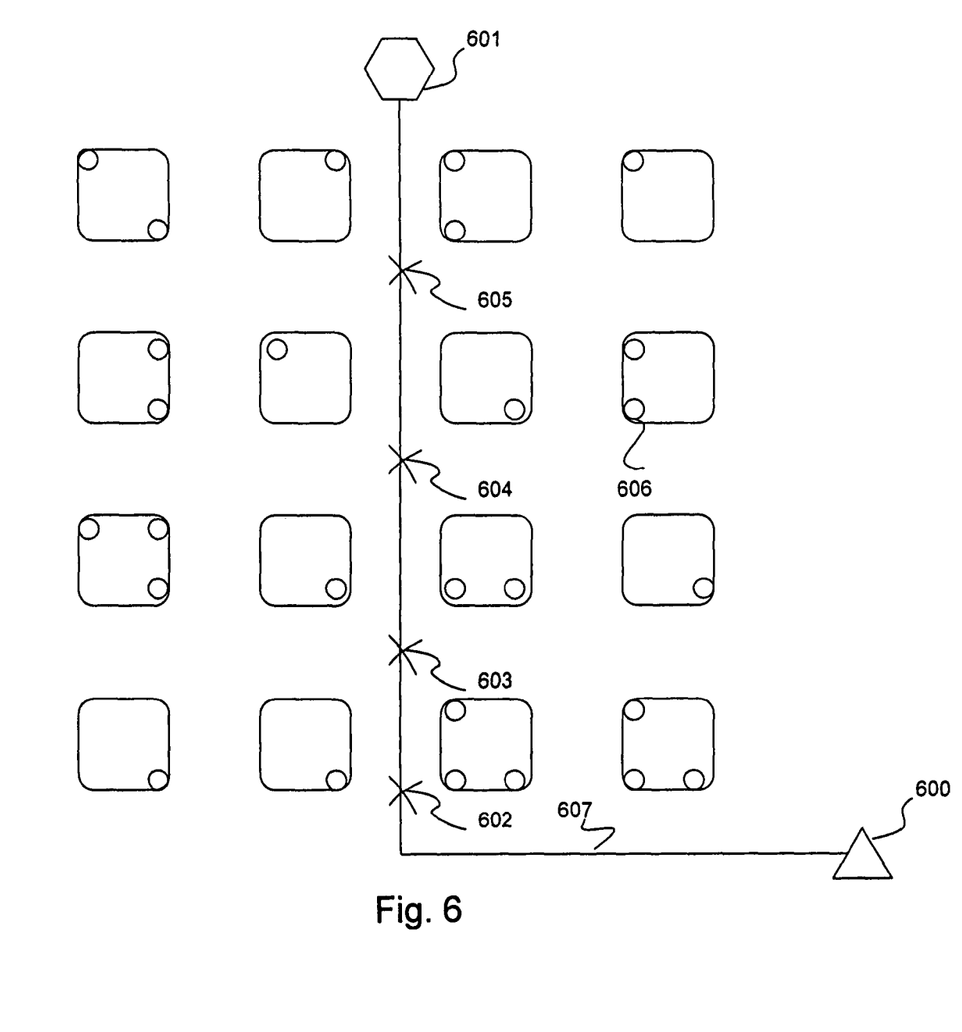
FIG. 6 schematically illustrates an exemplary course of movement of a wireless terminal.

FIG. 6 schematically illustrates another exemplary course of movement 607 of wireless terminal 100 plotted on a map and changes in the mode of a positioning service along this course. Depicted is a course of movement 607 on which the wireless terminal 100 moves from starting position 600 to finishing position 601 over time. The course of movement 607 is identical to a guidance route determined by the executed navigation code 114 for the wireless terminal 100. The course of movement 607 passes various regions characterized by a varying density of WLAN APs as determined by the position information on individual WLAN APs, such as WLAN AP 606, on a map 117. Points 602, 603, 604, 605 are indicated along the course of movement 607.

The wireless terminal 100 begins its movement along the course of movement 607 at starting position 600. The starting position 600 is in a region characterized by a high density of WLAN APs 606. Consequently, the positioning service of the wireless terminal 100 is switched to an active mode of WLAN-based positioning and a reduced power mode of GNSS based positioning. The wireless terminal 100 then commences its movement along the course of movement 607.

At the time that the wireless terminal 100 has reached point 602 on the course of movement 607, it is determined based on the position information of the WLAN APs 606 on the map 117 and the determined guidance route for the wireless terminal 100 that the wireless terminal 100 is going to enter a region characterized by a low density of WLAN APs 606 upon reaching the point 604. It is further determined that the wireless terminal 100 is going to leave the region characterized by a low density of WLAN APs 606 at point 605 and enter a region characterized by a high density of WLAN APs 606. Moreover, it is determined that there is a sufficient level of GNSS coverage in the region entered at point 605 for positioning in a GNSS-based mode of positioning to function. It is further estimated that the time that the wireless terminal 100 is going to be in that region while moving from point 604 to point 605 is sufficiently long to switch the positioning service to an active mode of GNSS-based positioning. An exemplary threshold for a time to be sufficiently long to switch the positioning service to an active mode of GNSS-based positioning would be 5 minutes.

At the time that the wireless terminal 100 has reached point 603, it is estimated that if the positioning service is switched to an active mode of GNSS-based positioning, then the GNSS-based positioning will be fully functional by the time that the wireless terminal 100 has reached point 604 and enters the region characterized by low WLAN AP density. Consequently, the positioning service is switched to an active mode of GNSS-based positioning. However, the positioning service remains simultaneously switched to an active mode of WLAN-based positioning.

Upon reaching point 604 on the course of movement 607, the wireless terminal 100 enters the region characterized by low WLAN AP density. The positioning service of the wireless terminal 100 is already switched to an active mode of GNSS-based positioning and this becomes fully functional. As the region is entered, the positioning service is also switched to a switched off mode of WLAN-based positioning.

At some point, the time is estimated at which the wireless terminal 100 is going to reach point 605 and thus is going to leave the region characterized by a low density of WLAN APs 606 and enter a region characterized by a high density of WLAN APs 606. However, because the WLAN-based positioning becomes functional practically at the same time that the positioning service is switched to an active mode of WLAN-based positioning, no time is estimated at which to switch the positioning service to an active mode of WLAN-based positioning before the estimated time at which the wireless terminal 100 is going to enter the region characterized by a high density of WLAN APs 606.

Having traversed the region characterized by a low density of WLAN APs 606, the wireless terminal 100 leaves the region characterized by a low density of WLAN APs 606 and enters a region characterized by a high density of WLAN APs 606 as it reaches point 605 on the course of movement 607. At this point, the positioning service is switched to an active mode of WLAN-based positioning and is also switched to a reduced power mode of GNSS-based positioning. Continuing its movement along the course of movement 607, the wireless terminal 100 reaches the finishing point 601.

Figure 7:
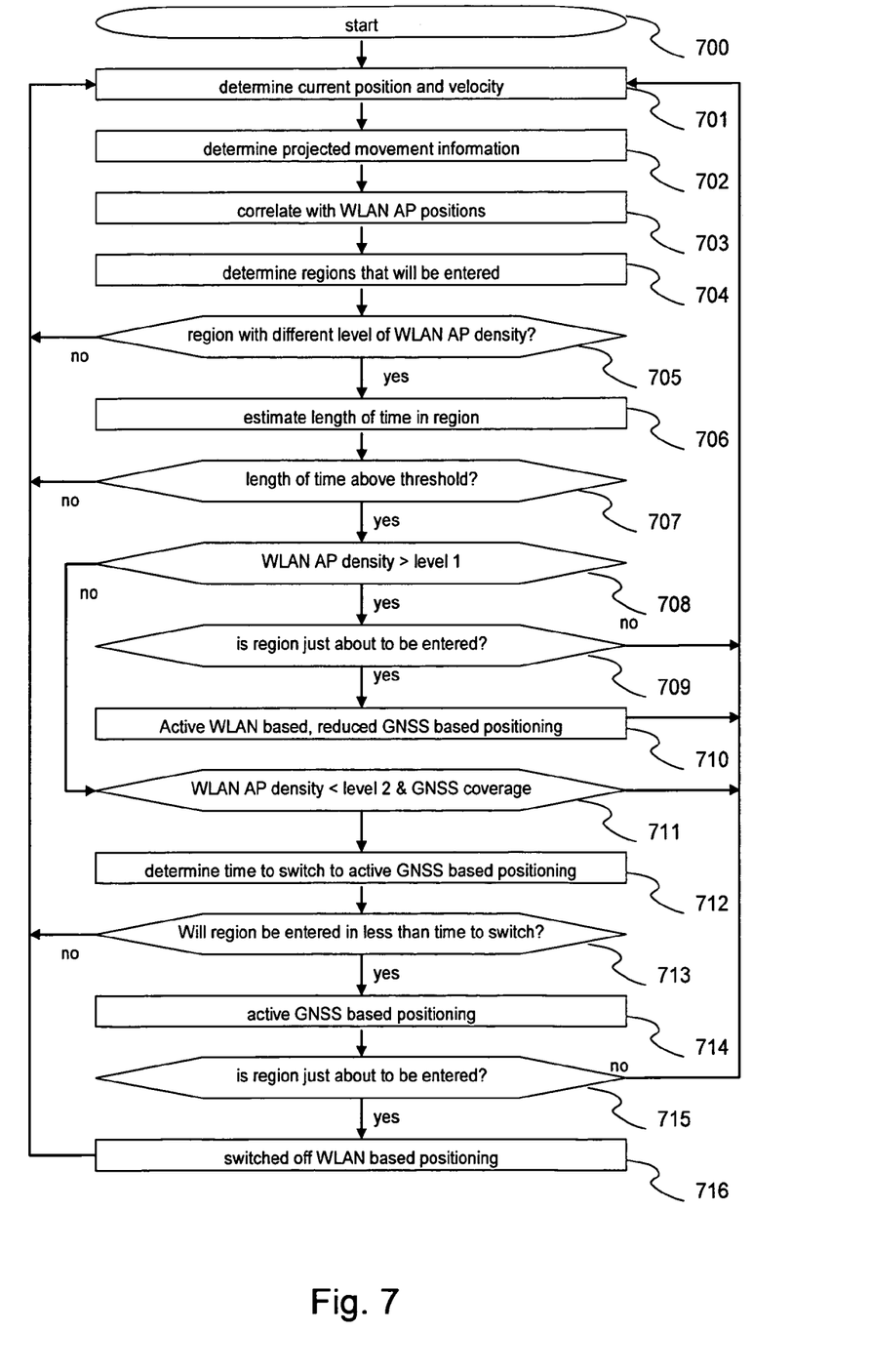
FIG. 7 is a flow chart illustrating an exemplary operation in the system of FIG. 1.

FIG. 7 is a flow chart illustrating an exemplary operation in the system of FIG. 1 in more detail. This operation comprises a loop which may be performed for an indefinite duration. The operation comprises a start step 700 in which the wireless terminal is started up and all functionalities are initialized.

Step 701 is the starting point for the iteration loop. After a completed iteration, step 701 is returned to. In step 701 the current position and velocity of the wireless terminal is determined. The current position may either be directly determined by the use of a positioning service, or it may be determined from a position determined at a previous time and the information that no movement has occurred since that time. The current position may also be supplied by any other source. The velocity may likewise be either directly determined by means of, for example, inertial sensors, or it may be determined by evaluating the change of position of the wireless terminal at previous moments in time.

In step 702, projected movement information is determined. If a guidance route has been determined by a guidance system for the wireless terminal, then the movement information may be determined based on the assumption that the wireless terminal is going to follow the determined guidance route. The velocity of the wireless terminal while following the guidance route may either be determined by assuming the previously determined current velocity or by assuming a velocity determined by the guidance system based on the kind of road the guidance route follows currently. The movement information may also be determined by any other method, for example by using dead reckoning based on the determined current position and velocity. The projected movement information may be determined for a specific length of time into the future, it may for example be determined for the next 30 seconds.

In step 703, this movement information is correlated with WLAN AP position information. The WLAN AP position information comprises at least an identifier and a position for each WLAN AP. This WLAN AP position information may be comprised in a WLAN AP location data 115 and in a map data 117 further recording each WLAN AP position and the identifier of each WLAN AP. Based on this information, regions along the projected movement of the wireless terminal according to the movement information may be determined which are characterized, for example, by different levels of WLAN AP density. Each region may be associated with a particular value bracket of WLAN AP density, such as illustrated in FIG. 6. Regions may also be determined which are characterized by having a predetermined number WLAN APs within a maximum distance. The regions may further be determined by using a combined quality of signal reception from WLAN APs as characterization. Furthermore, the regions may also be predetermined and thus not based on an evaluation of the position information on the WLAN APs. By way of example, each region is determined based on the position information on the WLAN APs characterized by a level of WLAN AP density. The information about these regions may be stored in the map data 117.

In step 704 it is estimated which regions are entered by the wireless terminal and when the regions are entered by the wireless terminal. The estimation is based on the movement information and on the predetermined regions or the regions determined based on the evaluation of the position information about the WLAN APs. In particular, the characteristic associated with each region that is estimated to be entered is determined. Thus, in this example the level of WLAN AP density is determined for each region that is estimated to be entered. The characteristic associated with each region may also be stored in the map data 117.

In step 705, it is evaluated whether any of the regions estimated to be entered is associated with a WLAN AP density that is different from the WLAN AP density of the region that the wireless terminal is currently in. If none of the regions estimated to be entered is associated with a different WLAN AP density, then it is returned to step 701 and the next iteration is further proceeded from there. If a region estimated to be entered is associated with a different WLAN AP density, then it is proceeded to step 706.

In step 706 the length of time that the wireless terminal is going to spend in the region which is associated with a different WLAN AP density is estimated. This estimation is based on the movement information of the wireless terminal, which comprises the estimated velocity with which the wireless terminal is estimated to traverse the region and also the route which the wireless terminal will take to traverse the region. If the movement information is based on an extrapolation of the current velocity of the wireless terminal into the future, then it may be assumed that the wireless terminal will continue moving with this velocity, which would moreover imply the identical direction of movement. If on the other hand the movement information is based on a determined guidance route for the wireless terminal, then it may be assumed that the wireless terminal will move along this guidance route, possibly with an estimated velocity along the guidance route also determined by the guidance system.

In step 707, it is evaluated whether the estimated length of time that the wireless terminal is going to spend in the region with a different level of WLAN AP density is above a threshold value. If the estimated length of time is below this threshold value, then it is returned to step 702 and the next iteration further proceeds from there. This is because switching the positioning service to an active GNSS-based mode of positioning may take longer than the actual time spent in a region associated with low WLAN AP density because the region may be small.

If the estimated length of time is above this threshold value, then it is proceeded to step 708.

In step 708 it is evaluated whether the WLAN AP density level associated with the region that the wireless terminal is estimated to enter is above a first threshold WLAN AP density level. If it is not, it is proceeded to step 711. If it is, it is proceeded to step 709.

In step 709 it is evaluated whether the region that the wireless terminal is estimated to enter is just about to be entered. This may mean that the wireless terminal is estimated to enter the region before the next iteration of the method illustrated by the flow chart. If the region which the wireless terminal is estimated to enter is not just about to be entered, then it is proceeded to step 701 and to the next iteration. If that region is just about to be entered, then it is proceeded to step 710.

In step 710, if the positioning service is not already switched to an active mode of WLAN-based positioning, then it is now switched to an active mode of WLAN-based positioning. If, on the other hand, the positioning service is already switched to an active mode of WLAN-based positioning, then it remains switched to an active mode of WLAN-based positioning. Similarly, if the positioning service is not switched to a reduced power consumption mode of a GNSS-based positioning, then the positioning service is switched to a reduced power consumption mode of a GNSS-based positioning. Subsequently it is returned to step 701 for a next iteration.

In step 711 it is evaluated whether the WLAN AP density level associated with the region that the wireless terminal is estimated to enter is below a second threshold WLAN AP density level and whether available GNSS coverage is also associated with that region. If both the WLAN AP density level is below a second threshold level and GNSS coverage is available, then it is proceeded to step 712. If either the WLAN AP density level is not below a second threshold level or GNSS coverage is not available, then it is returned to step 701 for a next iteration.

In step 712 the time is determined which it takes a GNSS-based positioning to become functional once a positioning service is switched to an active mode of a GNSS-based positioning. This may essentially be the time that it takes to power up a GNSS receiver, for example the GPS receiver of GPS component 104 of FIG. 1, and further the time that the GNSS receiver may take to lock the GNSS signal.

In step 713 it is evaluated whether the time for a GNSS-based positioning to become functional is equal to or exceeds the time before it is estimated that the wireless terminal enters the region associated with a different level of WLAN AP density. If so, then it is proceeded to step 714. If not, it is returned to step 702 for a next iteration.

If In step 714 the positioning service is not already switched to an active mode of a GNSS-based positioning, then it is now switched to an active mode of a GNSS-based positioning. If, on the other hand, the positioning service is already switched to an active mode of a GNSS-based positioning, then it remains switched to an active mode of a GNSS-based positioning. Subsequently it is proceeded to step 715.

In step 715 it is evaluated whether the region that the wireless terminal is estimated to enter is just about to be entered. This may mean that the wireless terminal is estimated to enter the region before the next iteration of the method illustrated by the flow chart. If the region which the wireless terminal is estimated to enter is not just about to be entered, then it is returned to step 701 and to the next iteration. If that region is just about to be entered, then it is proceeded to step 716.

In step 716, if the positioning service is not already switched to a switched off mode of WLAN-based positioning, then it is now switched to a switched off mode of WLAN-based positioning. If, on the other hand, the positioning service is already switched to a switched off mode of WLAN-based positioning, then it remains switched to a switched off mode of WLAN-based positioning. Subsequently it is returned to step 701 for a next iteration.

The functions illustrated by the processing component 119 executing program code 111-114 and 121 can be viewed as means for correlating movement information about a wireless client with information about the availability of wireless access points and as means for estimating based on a result of the correlating whether the wireless client is going to enter a region associated with a predetermined characteristic. Alternatively, the functions illustrated by the functional modules of the program code 111-114 and 121 can be viewed as such means.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
   correlating movement information about a wireless client with information about an availability of wireless access points, the information about the availability stored in a memory in the wireless client; and
   estimating, in the wireless client, based on a result of the correlating whether the wireless client is going to enter a region associated with a predetermined characteristic;
   wherein the information about the availability of wireless access points comprises information about positions of the wireless access points and wherein the predetermined characteristic associated with the region comprises a functioning of a positioning service to the wireless client.

2. The method according to claim 1, wherein the estimating whether the wireless client is going to enter the region comprises estimating a point in time when the wireless client is going to enter the region.

3. The method according to claim 2, further comprising using the estimated point in time when the wireless client is going to enter the region as a decision criterion for switching a service to at least one of at least two modes.

4. The method according to claim 3, wherein a positioning service is switched to an active mode of a global navigation satellite system based positioning in time to ensure that the positioning service is functional in an active mode of the global navigation satellite system based positioning at the estimated time when the wireless client is going to enter the region.

5. The method according to claim 1, further comprising:
using a result of the estimation whether the wireless client is going to enter the region as a decision criterion for switching a service to at least one of at least two modes, wherein the service is a positioning service comprising a plurality of modes of positioning, and wherein the plurality of modes of positioning comprises at least one of:
an active mode of a global navigation satellite system based positioning;
a reduced power consumption mode of a global navigation satellite system based positioning;
a switched off mode of a global navigation satellite system based positioning;
an active mode of terrestrial positioning;
a reduced power consumption mode of terrestrial positioning; and
a switched off mode of terrestrial positioning.

6. The method according to claim 1, wherein the predetermined characteristic is associated with the region by means of a map.

7. The method according to claim 1, further comprising determining the movement information based on a position and a velocity of the wireless client.

8. The method according to claim 1, further comprising determining the movement information based on a determined guidance route.

9. The method according to claim 1, wherein the predetermined characteristic comprises at least one of a level of wireless access point density and a level of global navigation satellite system coverage.

10. The method according to claim 1, further comprising estimating the length of time that the wireless client will be in the region associated with the predetermined characteristic.

11. The method according to claim 10, comprising using the estimated length of time that the wireless client will be in the region as a decision criterion for switching a service to at least one of at least two modes.

12. The method according to claim 1, further comprising updating an association of the region with the predetermined characteristic, wherein the predetermined characteristic indicates whether a global navigation satellite system based mode of positioning is possible or not.

13. The method according to claim 1, wherein the wireless access points comprise at least one of:
wireless local area network communication access points;
Wi-Fi™ communication access points;
WiMax communication access points;
cellular communication access points;
Bluetooth® communication access points;
Wibree™ communication access points; and
ZigBee® communication access points.

14. The method according to claim 1, wherein the positioning service comprises at least a first service and a different second service so as to allow the wireless client to choose the positioning service at least partly based on relative power consumption in the wireless client between using the first service and using the second service.

15. An apparatus comprising:
a memory configured to store information about an availability of wireless access points; and
a processor configured to correlate movement information about a wireless client with the information about the availability of wireless access points; and
to estimate based on a result of the correlating whether the wireless client is going to enter a region associated with a predetermined characteristic;
wherein the information about the availability of wireless access points comprises information about positions of the wireless access points and wherein the predetermined characteristic associated with the region comprises a functioning of a positioning service to the wireless client.

16. The apparatus according to claim 15, wherein the processor is further configured to estimate a point in time when the wireless client is going to enter the region.

17. The apparatus according to claim 16, wherein the processor is further configured to use the estimated point in time when the wireless client is going to enter the region as a decision criterion for switching a service to at least one of at least two modes.

18. The apparatus according to claim 16, wherein the processor is further configured to switch a positioning service to an active mode of a global navigation satellite system based positioning in time to ensure that the positioning service is functional in an active mode of the global navigation satellite system based positioning at the estimated point in time when the wireless client is going to enter the region.

19. The apparatus according to claim 15, wherein the processor is further configured to use the result of the estimation whether the wireless client is going to enter the region as a decision criterion for switching a service to at least one of at least two modes.

20. The apparatus according to claim 19, wherein the service is a positioning service comprising a plurality of modes of positioning, said plurality of modes of positioning comprising at least one of:
an active mode of a global navigation satellite system based positioning;
a reduced power consumption mode of a global navigation satellite system based positioning;
a switched off mode of a global navigation satellite system based positioning;
an active mode of terrestrial positioning;
a reduced power consumption mode of terrestrial positioning; and
a switched off mode of terrestrial positioning.

21. The apparatus according to claim 15, wherein the processor is further configured to determine a position and a velocity of the wireless client, and to determine the movement information based on the position and the velocity of the wireless client.

22. The apparatus according to claim 15, wherein the processor is further configured to determine a guidance route, and wherein the movement information is determined at least partly based on the guidance route.

23. The apparatus according to claim 15, wherein the predetermined characteristic comprises at least one of a level of wireless access point density and a level of global navigation satellite system coverage.

24. The apparatus according to claim 15, wherein the predetermined characteristic is associated with the region by means of a map.

25. The apparatus according to claim 15, wherein the processor is further configured to estimate the length of time that the wireless client will be in the region.

26. The apparatus according to claim 25, wherein the processor is further configured to use the estimated length of time as a decision criterion for switching a service to at least one of at least two modes.

27. The apparatus according to claim 15, wherein the processor is further configured to update an association of the region to the predetermined characteristic, wherein the predetermined characteristic indicates whether a global navigation satellite system based mode of positioning is possible or not.

28. The apparatus according to claim 15, wherein the positioning service comprises at least a first service and a different second service so as to allow the wireless client to choose the positioning service at least partly based on relative power consumption in the wireless client between using the first service and using the second service.

29. A device comprising:
 a memory configured to store information about an availability of wireless access points; and
 a processor configured to correlate movement information about a wireless client with the information about the availability of wireless access points and to estimate based on a result of the correlating whether the wireless client is going to enter a region associated with a predetermined characteristic, wherein the information about the availability of wireless access points comprises information about positions of the wireless access points and the predetermined characteristic associated with the region comprises a functioning of a positioning service to the wireless client.

30. The device according to claim 29, further comprising a user interface.

31. A system comprising:
 a plurality of wireless access points; and
 an apparatus according to claim 15.

32. An apparatus comprising:
 means for correlating movement information about a wireless client with information about the availability of wireless access points;
 means for storing the information, and
 means for estimating based on a result of the correlating whether the wireless client is going to enter a region associated with a predetermined characteristic,
 wherein the information about the availability of wireless access points comprises information about positions of the wireless access points and wherein the predetermined characteristic associated with the region comprises a functioning of a positioning service to the wireless client.

* * * * *